J. H. PETERSON.
TRACTION WHEEL.
APPLICATION FILED JAN. 31, 1916.

1,234,689.

Patented July 24, 1917.
2 SHEETS—SHEET 1.

James H. Peterson
INVENTOR

BY
J. M. Thomas
ATTORNEY

J. H. PETERSON.
TRACTION WHEEL.
APPLICATION FILED JAN. 31, 1916.
1,234,689.
Patented July 24, 1917.
2 SHEETS—SHEET 2.
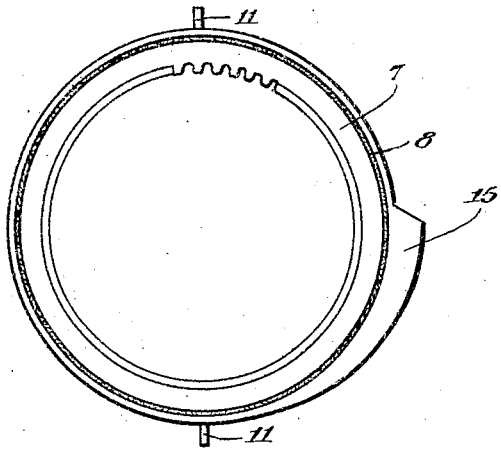
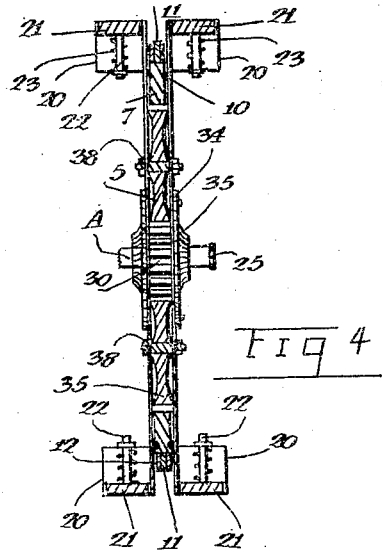
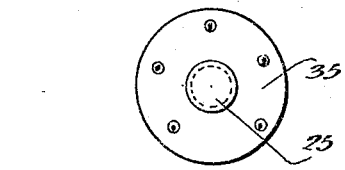
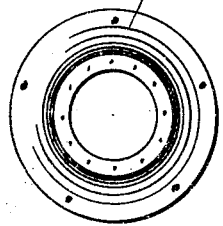
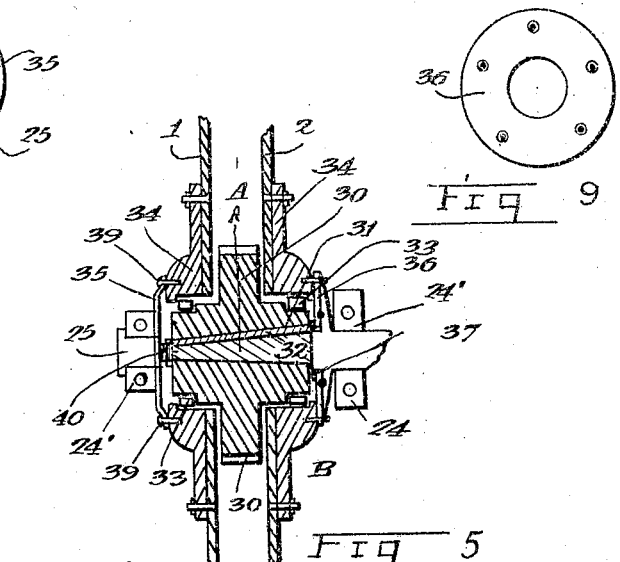
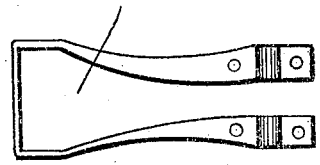
INVENTOR
ATTORNEY

UNITED STATES PATENT OFFICE.

JAMES H. PETERSON, OF PRICE, UTAH.

TRACTION-WHEEL.

1,234,689. Specification of Letters Patent. Patented July 24, 1917.

Application filed January 31, 1916. Serial No. 75,463.

*To all whom it may concern:*

Be it known that I, JAMES H. PETERSON, a citizen of the United States, residing at Price, in the county of Carbon and State of Utah, have invented certain new and useful Improvements in Traction-Wheels, of which the following is a specification.

My invention relates to traction wheels and has for its object to provide a pair of traction wheels which may be mounted on the rear axle of an automobile or other power driven vehicle, and which will provide laterally extended power driven treads for said wheels to which the power of the engine is applied at such reduced speed that greater tractive power is secured than has previously been obtained from such road vehicles.

A further object is to load the traction friction or soil gripping power of the automobile by the weight of the automobile at the end of a lever; a still further object is to provide an economical and efficient wheel tread.

These objects I accomplish with the device illustrated in the accompanying drawings in which similar letters and figures of reference indicate like parts throughout the several figures, and as described in the specification forming a part of this application and pointed out in the appended claims.

Figure 1:
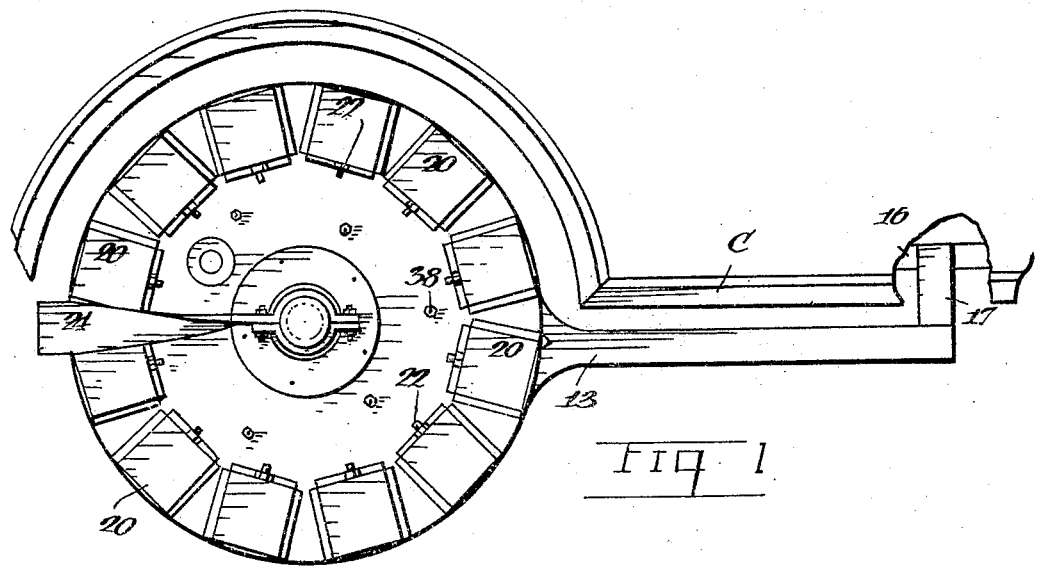
Figure 2:
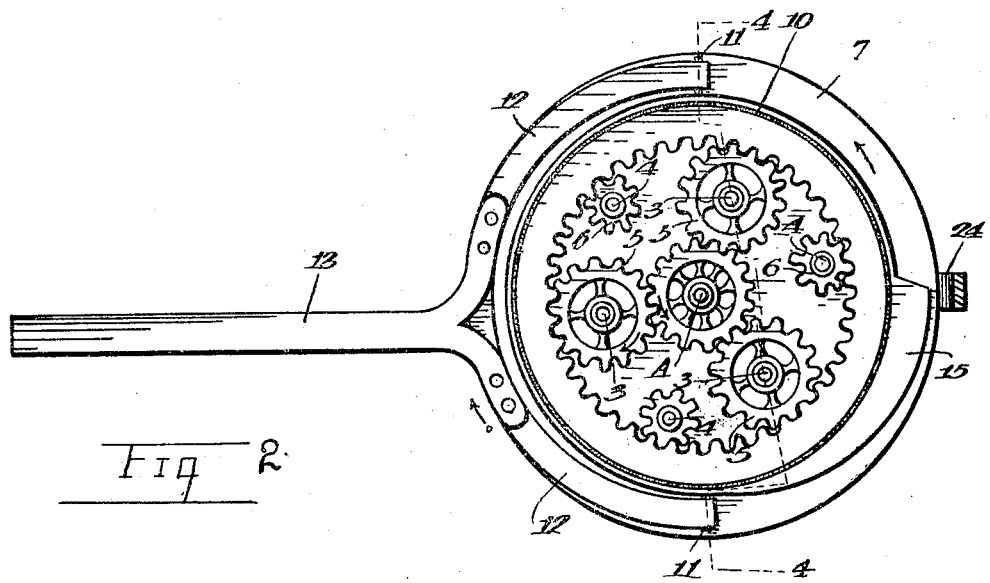

In the drawings in which I have shown a substantial embodiment of my invention, Figure 1 is a side elevation of one of the traction wheels in place on the rear axle of an automobile, and showing my traction lever and draw bar in place with the running board and fender of one rear wheel. Fig. 2 is a side elevation of the same wheel with one of the tread carrying cases removed, parts in section. Fig. 3 is a detail side elevation of the annular rack. Fig. 4. is a section on line 4 of Fig. 2. Fig. 5 is a diametrical section of the hub of the wheel and axle of the car. Fig. 6 is a detail of the outer hub cap shown in side elevation and draw-bar lug in dotted lines. Fig. 7 is a plan view of one of the hub braces. Fig. 8 is a plan view of the draw-bar connection. Fig. 9 is a plan view of the inner hub cap.

The body and other portions of an automobile are often worn out when the engine is still in good condition and will develop as much power as when first used, and my invention is intended for use in connection with the frame and engine of such automobiles as well as with machines designed especially for my wheels.

In the present invention two circular disks 1 and 2 are spaced apart and held in fixed relation to each other by the shaft bolts 3, and 4. On each of the said shaft bolts 3 is journaled one of the gear wheels 5, and on each of the shaft bolts 4 is journaled one of the idler gears 6. The annular rack 7 is mounted on the said gears 5 and 6 and has internally disposed teeth or cogs which mesh with the teeth or cogs of the gear wheels 5 and 6. The said annular rack 7 is carried in bearing contact with the outer portions of the said disks 1 and 2, and for the purpose of lessening friction and consequent wear of the contacting portions, annular packing grooves 8 and 9 are cut in the side faces of said rack 7 in which suitable packing 10 is provided. Stub shafts or lugs 11 are secured in the top and bottom of said annular rack 7 on which the arms 12 of the lever 13 are carried and by which circular movement of said rack is prevented. A clearance projection 15 is provided on the outer face of said rack 7, by gradually increasing the radial thickness of the rack from near the lower one of said shafts 11 to practically one-fourth of the periphery of said rack. The said friction lever 13 is rigidly fastened at its rear end to the arms 12, and the front extends along the side of the automobile under the running board C, and is secured to the chassis frame 16 of the automobile, by U-shaped clamps 17, which carry the front end of each of said levers in fixed relation to the body of the automobile. On the outer face and adjacent the peripheric edge of each of said disks is secured a plurality of box like tread cases 20. The three sides and the inclosed portion of the contiguous disk form the closed walls of said cases. The peripheric ends are open and their inner ends are perforated. In each of said cases 20 a wooden block or shoe 21 is radially operated, and said shoes are held in place by bolts passed therethrough and through the said perforation in the inner end of said case with nuts screwed thereon. A spiral spring 23 is carried on each of said bolts which tend to press said shoes outwardly but will allow each shoe and its respective bolt to be moved radially inward and when the shoe comes into contact with the ground it will be moved radially inward and allow the outer edge of the cases to grip the soil as an open cup, and when weight is off of said cases the shoe will clear itself of mud or soil. On each of said wheels is provided a draft clamp 24 which is practically U-shaped and one arm of which is detachably carried on the housing of the axle of the automobile and the other on the hub cap of the wheel by inclosing the axially extended lug 25. The wheels are carried on the axle of the automobile by detachable hubs B, each of which consists of a pinion gear, 30, the teeth of which mesh with the teeth of the gear wheels 5 and impart motion thereto. The said pinion is bored to fit on the axle of the automobile, that shown is for a tapered axle, and is provided with a key way 31 in which a key 32 is carried. Roller bearings 33 are provided, of any of the well known makes, on which the wheel is rotated, and bearing braces 34 are bolted on said disks 1 and 2, and brace the wheel against lateral movement and hold the roller bearing cases in place.

A hub cap 35 is fastened on the outer of said bearing braces 34 for the double purpose of preventing dust from entering the gear race between the said disks 1 and 2, and also to act as a lug 25 on which one arm of the draft clamp 24 is journaled. An inner hub cap 36 is fastened to the inner of said bearing braces 34 and bears against a felt washer 37 which is carried on the axle of the automobile and prevents dust from entering the gear race on that side of the wheel.

The assembling and operation of my device is as follows:

The pinion 30 is internally bored to fit the style of axle used on the different makes of automobiles or machines and is the only part of my device that must be changed to make it possible to use the wheels on any make of an automobile. To remove one style of pinions and replace with another, the casing 2 is taken off by turning the nuts 38 off of the shaft bolts 3 and 4, and then the other style of pinion 30 is put into place with its teeth meshing with the teeth of the gears 5 and 6. To take off my traction wheels and put on the common wheels used on the rear axle, the hub cap 35 is removed by withdrawing the tap bolts 39 when the wheel may be slipped off of the axle by removing the axle nut 40 and the common wheel put in its place. The rotation of the rear axle A, by the power of the engine, rotates the pinion 30, this in turn rotates the gears 5. As the gears 5 are in mesh with the rack 7, which does not rotate, the gears 5 and their bearing members—the casings 1 and 2—are carried around the axle A, and the wheels are rotated. The tendency of the rack 7 to rotate in the direction of the arrow $o$ bears upwardly on the lever 13 and a portion of the weight of the automobile is applied to the wheels at the forward end of the levers 13. Should any soil be held in the race between the outer peripheric edges of the casings 1 and 2 as they are rotated the projection 15 presses such soil out and clears the race. Any form of draw-bar may be secured on the rear of the draft clamps 24 extending from one to the other if desired.

Having thus described my invention I desire to secure by Letters Patent and claim:—

1. Traction wheels consisting of two spaced apart disks with their faces parallel to each other; a power driven pinion operable between said disks; planetary gears meshing with said pinion; shaft bolts to hold said disks in spaced relation to each other and on which said planetary gears are mounted; an annular rack carried on said planetary gears and of less diameter than said disks; an integral clearance shoe on a portion of the periphery of said rack; radially extended lugs on said rack; and a bifurcated lever carried at one end on said lugs to prevent the rotation of said rack.

2. A traction wheel consisting of parallel spaced apart disks; a power driven pinion operable between said disks and on which said disks are journaled; planetary gears meshing with said pinion; shaft bolts to hold said disks in spaced relation to each other and on which said planetary gears are mounted; and annular internally toothed rack carried on said planetary gears; radially extended lugs on said rack; and a lever having one end secured on said lugs to prevent the rotation of said rack.

In testimony whereof I have affixed my signature in presence of a witness.

JAMES H. PETERSON.

Witness:
  SAM RANEY.